United States Patent
Chang

(10) Patent No.: US 8,217,961 B2
(45) Date of Patent: *Jul. 10, 2012

(54) METHOD FOR ESTIMATING 3D POSE OF SPECULAR OBJECTS

(75) Inventor: Ju Yong Chang, Seoul (KR)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 338 days.

This patent is subject to a terminal disclaimer.

(21) Appl. No.: 12/412,452

(22) Filed: Mar. 27, 2009

(65) Prior Publication Data

US 2010/0245355 A1    Sep. 30, 2010

(51) Int. Cl.
  *G09G 5/00* (2006.01)
  *G06K 9/00* (2006.01)
(52) U.S. Cl. ........................ 345/619; 382/154
(58) Field of Classification Search ........... 345/619; 382/154

See application file for complete search history.

(56) References Cited

U.S. PATENT DOCUMENTS

| | | | |
|---|---|---|---|
| 5,870,486 A * | 2/1999 | Choate et al. | 382/103 |
| 6,556,196 B1 * | 4/2003 | Blanz et al. | 345/419 |
| 6,975,750 B2 * | 12/2005 | Yan et al. | 382/118 |
| 7,536,030 B2 * | 5/2009 | Wang et al. | 382/103 |
| 7,756,325 B2 * | 7/2010 | Vetter et al. | 382/154 |
| 2007/0031028 A1 * | 2/2007 | Vetter et al. | 382/154 |
| 2007/0122001 A1 * | 5/2007 | Wang et al. | 382/103 |
| 2009/0074238 A1 | 3/2009 | Pfister | |
| 2010/0296724 A1 * | 11/2010 | Chang et al. | 382/154 |

OTHER PUBLICATIONS

Lei et al., Face shape recovery from a single image using CCA mapping between tensor spaces, Jun. 23-28, 2008, IEEE Conference on Computer Vision and Pattern Recognition, pp. 1-7.*
Zhang et al., Recognizing rotated faces from frontal and side views: an approach toward effective use of mugshot databases, Dec. 2008, IEEE transactions on Information Forensics and Security, pp. 684-697.*
Romdhani et al., Estimating 3D shape and texture using pixel intensity, edges, specular highlights, texture constraints and a prior, Jun. 20-25, 2005, IEEE Computer Society Conference on Computer Vision and Pattern Recognition, pp. 986-993.*

* cited by examiner

*Primary Examiner* — M Good Johnson
(74) *Attorney, Agent, or Firm* — Dirk Brinkman; Gene Vinokur

(57) ABSTRACT

A method estimates a 3D pose of a 3D specular object in an environment. In a preprocessing step, a set of pairs of 2D reference images are generated using a 3D model of the object, and a set of poses of the object, wherein each pair of reference images is associated with one of the poses. Then, a pair of 2D input images are acquired of the object. A rough 3D pose of the object is estimated by comparing features in the pair of 2D input images and the features in each pair of 2D reference images using a rough cost function. The rough estimate is refined using a fine cost function.

21 Claims, 4 Drawing Sheets

METHOD FOR ESTIMATING 3D POSE OF SPECULAR OBJECTS

FIELD OF THE INVENTION

This invention relates generally to estimating 3D pose of objects, and more particularly to estimating the 3D pose of specular objects.

BACKGROUND OF THE INVENTION

Three-dimensional (3D) pose estimation determines the location (translation) and angular orientation of an object. Typical, pose estimation methods rely on several cues, such as 2D texture images, and 3D range images. Texture images based methods assume that the texture is invariant to variations of the environment. However, this assumption is not true if there are severe illumination changes or shadows. Specular objects cannot be handled by those methods.

Range images based methods can overcome these difficulties, because they exploit 3D information that is independent of the appearance of objects. However, range acquisition equipment is more expensive than simple cameras.

For some objects, it is very difficult to reconstruct the 3D shape. For example, recovering 3D shape of highly specular objects, such as mirror-like or shiny metallic objects is known to be difficult and unreliable.

Reflection cues are more sensitive to pose changes than texture or range cues. Therefore, exploiting the reflection cues enables pose parameters to be estimated very accurately. However, it is not clear whether the reflection cues are applicable to global pose estimation, i.e., object detection, rather than pose refinement.

Prior art methods are generally based on appearance, which is affected by illumination, shadows, and scale. Therefore it is difficult for those methods to overcome related problems such as partial occlusions, cluttered scenes, and large pose variations. To handle these difficulties, those methods use illumination invariant features, such as points, lines, and silhouettes, or illumination invariant cost functions such as a normalized cross correlation (NCC). However, the object is required to be sufficiently textured. Severe illumination changes can be still problematic, especially for specular objects.

A wide range of methods derive sparse local shape information from the identification and tracking of distorted reflections of light sources, and special known features. Dense measurements can be also obtained using a general framework of light-path triangulation. However, those methods usually need to perform accurate calibration and control of environments surrounding the object, and sometimes require many input images.

Some methods for specular object reconstruction do not require environment calibration. Those methods assume small environmental motion, which induces specular flow on the image plane. In those methods, the specular flow is exploited to simplify the inference of specular shapes in unknown complex lighting. However, a pair of linear partial differential equations has to be solved, and generally, that requires an initial condition, which is not easy to be estimated in real world applications.

One method for estimating the pose based on specular reflection uses a short image sequence and initial pose estimates computed by the standard template matching procedure. Lambertian and specular components are separated for each frame and environment maps are derived from the estimated specular images. Then, the environment maps and the image textures are concurrently aligned to increase the accuracy of the pose refinement process.

SUMMARY OF THE INVENTION

The embodiments of the invention provide a method, performed in a processor, for estimating a 3D pose of a 3D specular object in an environment. The basis for the estimation is matching features in 2D images of the specular object, acquired by a 2D camera.

In a preprocessing step, features are generated from a 3D model of the object and a set of possible poses of the object. The features are used to generate a set of pairs of reference images, one pair for each possible pose.

Then, a pair of input images is acquired of the object, and input features are also computed from the input images. A rough 3D pose of the object is estimated by comparing the features in the pair of input images with features in the pairs of reference images using a rough cost function. A fine 3D pose of the object is estimated using the rough 3D pose, and a fine cost function.

In one embodiment, the feature is specular intensity in the images. If the (RGB) channels are used, then the combined intensities is color. A small mirror-like sphere is arranged in the environment, and the pair of images is acquired, one at a short and the other at a long exposure. These images are used to construct a 2D environment map. The map is used to generate the pairs of reference images, which are subsequently compared with the pair input images to estimate the 3D pose of the specular object.

In another embodiment, the feature is specular flow in the images, which is a special case of the optical flow. The specular flows are generated for a set of 3D poses by inducing motion in the environment. The specular flows are used to generate the pairs of reference images. Input specular flow is also computed from the input images. The pairs of reference images are subsequently compared with the pair of input specular flow image to estimate the 3D pose of the specular object. As before, a fine pose is estimated from a rough pose using fine and rough cost functions.

DETAILED DESCRIPTION OF THE PREFERRED EMBODIMENT

Figure 1:
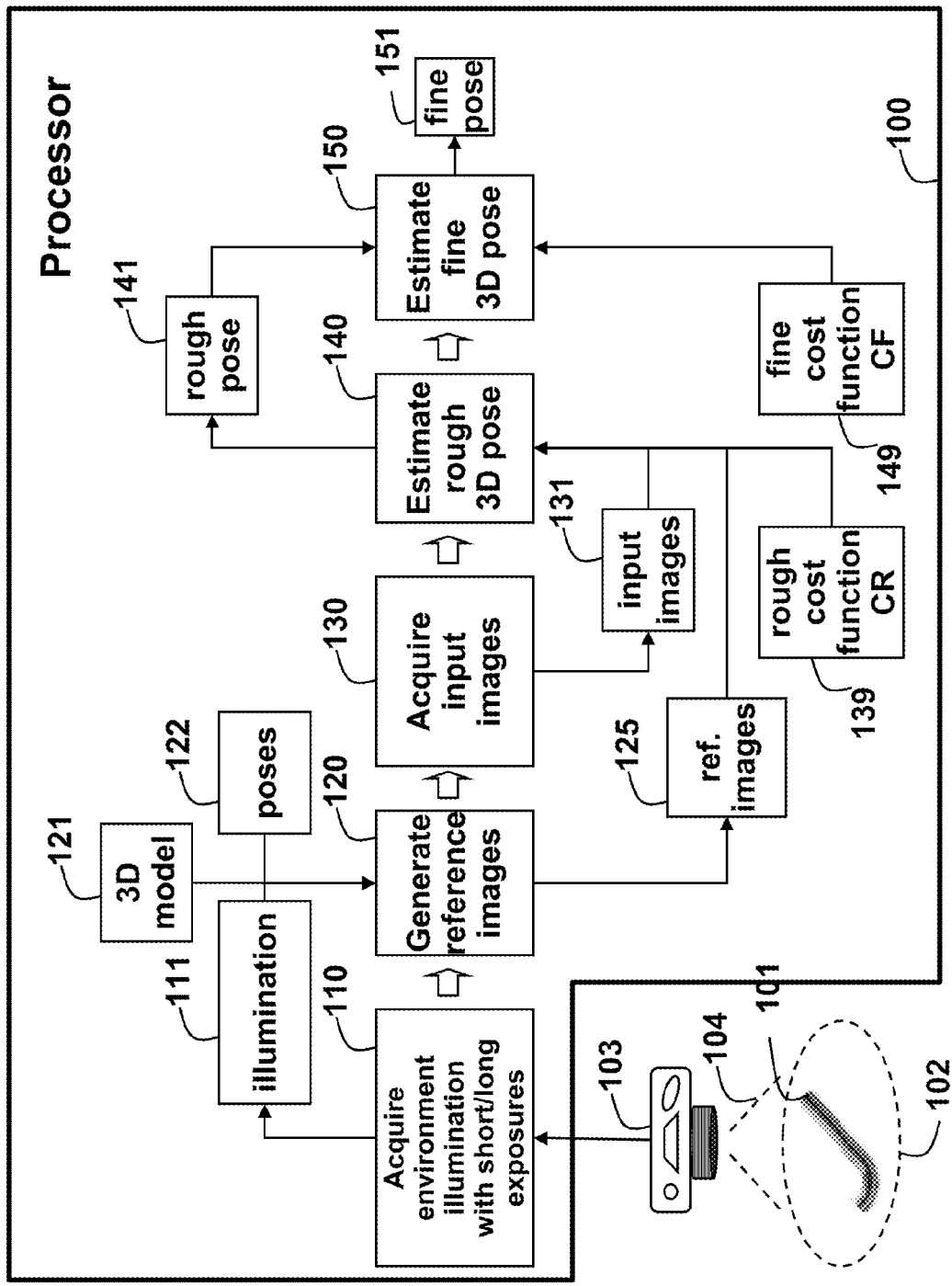
FIG. 1 is a flow diagram of a method for estimating a 3D pose of a specular object using specular intensity information according to embodiments of the invention.

FIG. 1 is a flow diagram of a method, performed in a processor 100 for estimating a 3D pose of an object 101 in an environment 102, wherein the object has a specular surface. In this embodiment, features are specular intensity. If three (RGB) channels are used, then the combined specular intensities have a color. Two-dimensional (2D) images of the environment are acquired by a camera 103.

The 3D pose is defined by a 3D translation vector (X, Y, Z) in a coordinate system of the camera, and 3D Euler angles (μ, ϕ, σ) for the orientation. In one application, the 3D pose is used to pick the object out of a bin in an automated robot arm application.

The object is textureless and highly specular such as a shiny metallic object. Thus, the only data available to the method are specular reflections of the object in the 2D images. A distance between the object and the camera is $Z \approx Z_0$. The distance can be used to determine a scale of projection.

The method uses a top-down approach starting with high level information, such as the shape of the object, photometric properties, and lighting illuminations. Then, low level features in 2D image are generated, and used to estimate the 3D pose.

The method generates the reference image 125 from the 3D model 121 using a mirror bidirectional reflectance distribution function (BRFD) for a large number of possible pose variations 122. The steps 110 and 120 can be one time preprocessing steps.

The 2D input images 131 are then compared with the reference images to determine the best matching 3D pose 151 of the specular object. The model can be a CAD/CAM, polygon, or any other suitable model.

In one embodiment, a small mirror-like sphere is arranged in the environment 102 without the object. The object is sufficiently far away from the surrounding environments, i.e., the area outside the bin in which the object is placed for picking. The 2D image acquired of this environment can then be used to generate environment maps 111, which represents illumination information. This illumination information can be used to generate 120 the reference specular images 125, which are used for the comparison with the input images.

In another embodiment, the method uses specular flow as features. The specular flow is defined as the optical flow induced by motion of the object, camera, or environment. The specular flow does not depend on the lighting illuminations but on the motion, the shape, and pose of the object. Therefore, the specular flows can be used as illumination invariant features for the pose estimation.

Environment Map Based Approach

As shown in FIG. 1, before estimating the 3D pose of the object, a pair of environment maps EL and ES 111 are acquired 110 of the environment 102 by placing a spherical mirror-like object. The maps have long and short exposures, respectively, e.g., about ¼ second and 1/60 second. The input images IL and IS 131 are acquired 130 at the same long and short exposures.

Rough Pose Estimation

Generating Reference Specular Images:

From the 3D model 121 of the object and the pair of environment maps IL and IS 111, the reference images 125 are generated for a large number of predefined poses 122 that correspond to possible poses of the object.

Therefore, the Euler angles are uniformly and densely sampled to define a large number of poses, e.g., 25,000. The reference images are RL and RS for various Euler angles (μ, ϕ, σ) at a location $(0, 0, Z_0)$. By ignoring inter-reflection and self-shadowing, perfect specular reflection images can be generated from EL and ES by applying the reflection mapping, which is a special case of texture mapping.

The reference specular images 125 depend on the 3D location, as well as the orientation of the object with respect to the camera. However, the camera has small field of view 104, and the depth of the object is known. Therefore the differences between the reference specular images generated from different 3D locations can be ignored. This is sufficient for rough pose estimation 140.

The input images 131 are compared with the reference specular images 125 to estimate 140 the rough pose 141 by solving $$(\hat{X}, \hat{Y}, \hat{\theta}, \hat{\phi}, \hat{\sigma}) = \underset{\theta,\phi,\sigma}{\arg\min}\left(\underset{X,Y}{\min}\, C_R(I_L, I_S, R^L_{\theta,\phi,\sigma}, R^S_{\theta,\phi,\sigma}, X, Y)\right), \quad (1)$$

where $(\hat{X}, \hat{Y}, \hat{\theta}, \hat{\phi}, \hat{\sigma})$ denotes the rough pose 141, CR( ) is a rough cost function 139 for the comparing, and arg min is a function that returns a minimum value, and the inner minimum is determined before the outer minimum.

The cost function 139 is $$C_R(I_L,I_S,R_{\theta,\phi,\sigma}^L,R_{\theta,\phi,\sigma}^S,X,Y)=(1-\lambda)C_1(I_S,R_{\theta,\phi,\sigma}^S,X,Y)+\lambda C_2(I_L,R_{\theta,\phi,\sigma}^L,X,Y), \quad (2)$$

where λ is a control parameter, and $C_1(\ )$ and $C_2(\ )$ are the cost functions for the long and short exposure images, respectively. To obtain these terms, the 3D translation vector (X, Y, $Z_0$) is projected onto the 2D image plane, and the reference image is moved to a projected point (x, y). Then, each pair of translated reference images is compared with the corresponding pair of input images.

Highlight Pixels Based Cost Function:

In general, the specular image includes highlight pixels and non-highlight pixels. The highlight pixels correspond to light sources, such as lamps or windows, with a high intensity incident light. Thus, the pixel values are usually saturated.

The highlight pixels are used for the first term $C_1(\ )$. Because the object is highly specular, the highlight pixels can be extracted by applying thresholding to the short exposed images to produce a binary image.

The binary images and a distance transform are used to construct distance images DI and DR corresponding to the input and reference highlight images, respectively. This distance transform helps to match the binary images accurately. Then, the cost function $C_1(\ )$ is defined as $$C_1(I_S, R^S_{\theta,\phi,\sigma}, X, Y) = \frac{1}{N_{highlight}}\sum_{(u,v)} |D_I(u,v) - D_R(u-x, v-y)|^2, \quad (3)$$

where (u, v) are pixel coordinates and $N_{highlight}$ denotes the number of pixels where the summation is carried out. The reference highlight pixels and their 1-pixel neighbors are used as a stencil for the computation.

This highlight based cost function has following advantages. First, the highlights are usually very sparse in the input image, so they can be used as a strong constraint for the object's location. Second, the cost distribution is smoother than that of the conventional cost functions using full specular pixels. Third, the stencil of the highlight contains a very small number of pixels, so computing this cost can be done efficiently. The downhill simplex procedure converges well to a global minimum very rapidly and stably.

Full Specular Pixels Based Cost Function:

The second term C2( ) considers full specular pixels $$C_2(I_L,R_{\theta,\phi,\sigma}^L,X,Y)=1-\mathrm{NCC}(I_L(u,v),R_{\theta,\phi,\sigma}^L(u-x,v-y)), \quad (4)$$

where NCC denotes normalized cross correlation (NCC). Here, the object's segmentation mask can be used as the stencil for the NCC. However, using only geometrically reliable specular pixels as the stencil produces better results in practice.

Figure 3:
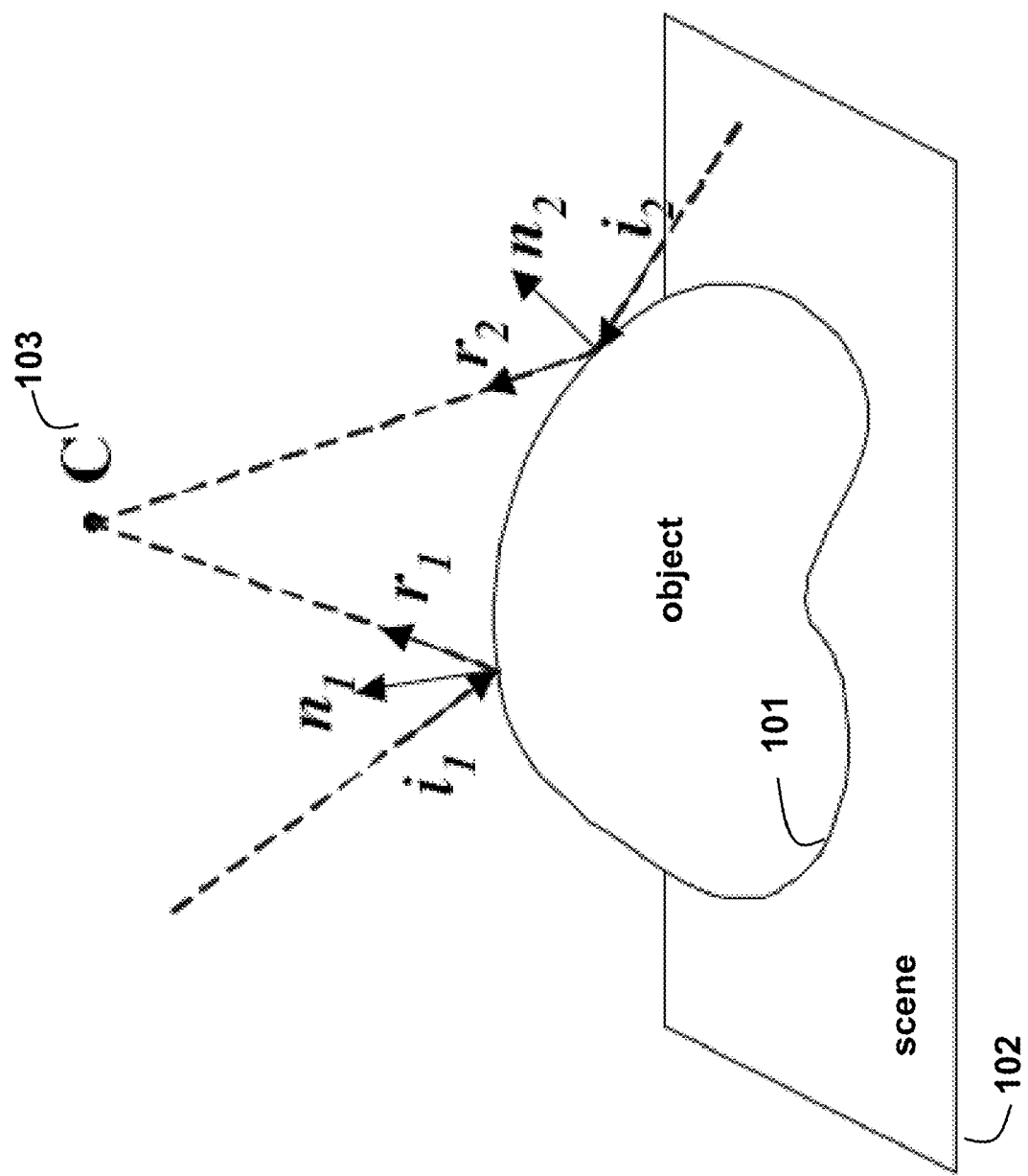
FIG. 3 is a schematic of stencil selection using incident rays according to embodiments of the invention.

As shown in FIG. 3, the geometric stencil selection is as follows. First, an incident light ray $\hat{i}$ is estimated for each pixel in the reference image, knowing the reflected light ray $\hat{r}$ and its surface normal $\hat{n}$. From the law of the reflection, the incident light ray is represented by $$\hat{i}=\hat{r}-2(\hat{n}\cdot\hat{r})\hat{n}.$$

Figure 4:
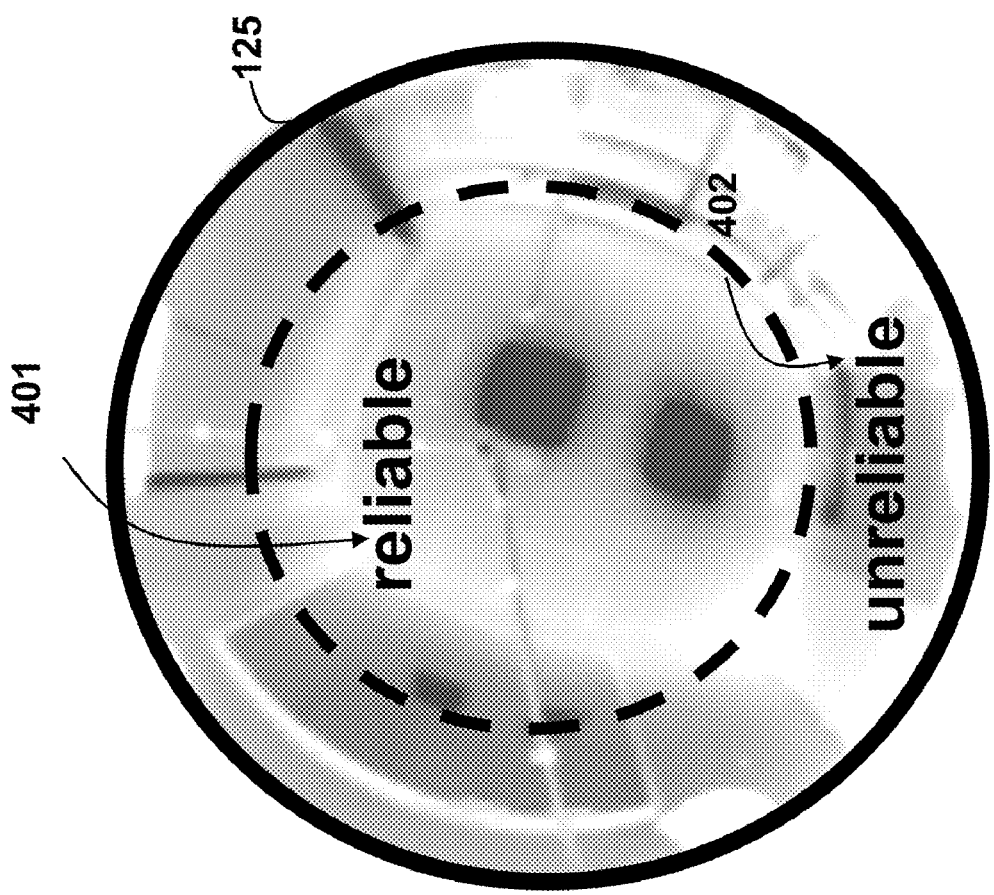
FIG. 4 is an example of reference image having reliable and unreliable pixels.

Then, the reliability of the pixel information can be defined by considering the illumination direction. As shown in FIG. 4 for an example reference image 125, illuminations from $i_1$ are reliable 401, and from $i_2$ are unreliable. The illumination direction is represented by elevation ($\cos^{-1} \hat{i}_z$), and azimuth ($\tan^{-1} \hat{i}_y/\hat{i}_x$) angles in the camera coordinate system.

The illumination with the small elevation angle is usually more unreliable than that with the large elevation angle because of inter-reflections between the specular objects and environment map changes, such as using a different background in the environment. Finally, for the stencil in Equation (4), only the reliable specular pixels are used, i.e., pixels with incident light rays at elevation angles larger than 90°.

Overall Procedures

The overall method for rough pose estimation is as follows. First, the reference specular images 125 are generated. For each possible pose 122, the optimal translation parameters are obtained. As the initial points for the downhill simplex procedure, arbitrary three corner points of the input image are used. The control parameter $\lambda$ is changed from 0 to 1, which means that translation is roughly optimized by using only highlight pixels, and then subsequently refined by also considering full specular pixels. After translation optimization, there are many translation optimized poses and their associated cost values. The minimal cost value is for the optimal rotation parameters $(\hat{\theta},\hat{\phi},\hat{\sigma})$.

Fine Pose Estimation

After estimating 140 the rough pose 141, the pose parameters can be further refined 150 by continuously optimizing the pose parameters. Translational pose is already continuously optimized by the downhill simplex procedure in the rough pose estimation, so only the rotational pose needs to be refined using the following cost function 149:

$$C_F(\theta,\phi,\sigma)=1-\text{NCC}(I_L(u,v),R_{\theta,\phi,\sigma,X,Y}(u,v)), \quad (5)$$

where R is the reference image obtained with the long exposed environment map EL. This optimization uses a steepest descent procedure.

Specular Flow Based Approach

Figure 2:
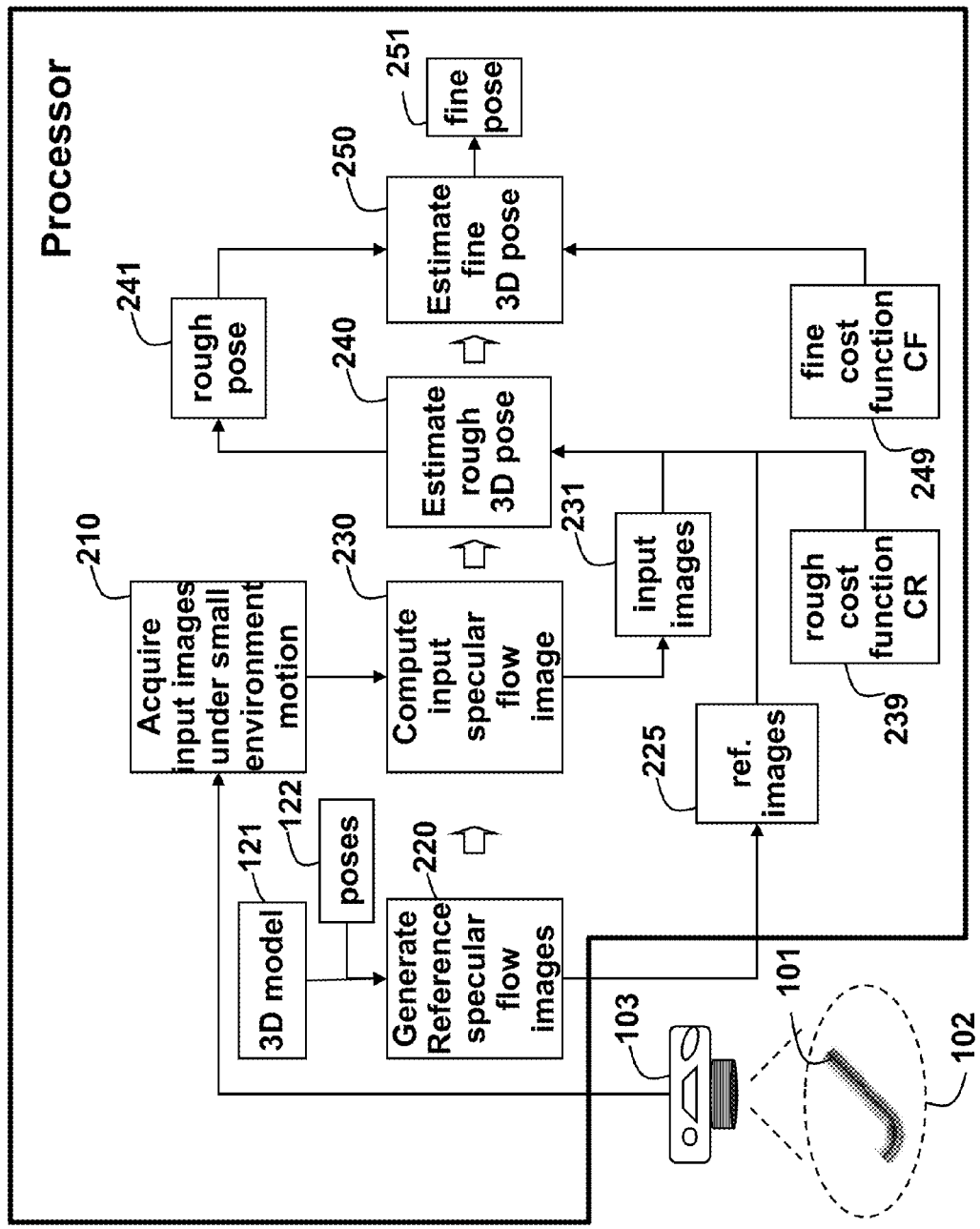
FIG. 2 is a flow diagram of a method for estimating a 3D pose of a specular object using specular flow information according to embodiments of the invention.

FIG. 2 shows the method where the optical flow is used as the feature for matching. In general, the optical flow is the pattern of apparent motion in the environment caused by the relative motion between camera and the environment. In this embodiment, the optical flow is assumed to be induced by environment motion. Two input images are acquired 210 under a predefined small rotation of environment around a known direction, e.g. the viewing direction of the camera 103. Then, the specular flow between these two images is determined to obtain the input specular flow image I 231 containing 2D displacement vectors for each pixel. A block matching procedure is used to determine the specular flow.

In general, the specular flow can be induced by motion of the object 101, the environment 102, or the camera 103. For simplicity of this description, only environment motion is used. Because the relative pose between camera and object is fixed, specular flow is only observed in the specular pixels. Therefore, this motion cue, which indicates whether the specular flow is present or not, can be used for strongly constraining the location of the object.

Rough Pose Estimation

Generating Reference Specular Flows:

For rough pose estimation 240 two specular images are generated 220 for locations (0, 0, $Z_0$) and various poses 122, as before with a color coded environment map, which is slightly rotating, e.g., 5± degrees. The color coded environment enables the determination of exact pixel correspondences between two images. The resultant optical flow image is used to generate the reference images R 225.

Rough Pose Optimization:

The reference images 225 are compared with acquired 230 input specular flow image I 231, and the rough 3D pose 241 is estimated 240 by minimizing a cost function 239:

$$C_R(I,R_{\theta,\phi,\sigma},X,Y)=(1-\lambda)C_1(I,R_{\theta,\phi,\sigma},X,Y)+\lambda C_2(I,R_{\theta,\phi,\sigma},X,Y), \quad (6)$$

where C1( ) and C2( ) are cost functions based on motion segmentation and specular flow, respectively. First, the translation (X, Y) is optimized for each rotation using the downhill simplex procedure. Then, the rotation is optimized by comparing all cost values.

Motion Segmentation Based Cost Function:

Motion segmentation is defined as a binary image indicating whether there is a nonzero specular flow or not for each pixel. Let $D_I$ and $D_R$ denote the distance transformed images constructed from motion segmentation of input image I 231, and the reference specular flow image R 225. The cost function C1( ) is $$C_1(I, R_{\theta,\phi,\sigma}, X, Y) = \frac{1}{N_{motion}}\sum_{(u,v)} |D_I(u, v) - D_R(u - x, v - y)|^2, \quad (7)$$

where the summation is carried out for motion segmentation pixels of the reference image R, and $N_{motion}$ denotes the number of such pixels.

Specular Flow Based Cost Function:

The second cost term $C_2$( ) in Equation (6) is constructed by comparing the input image I(u, v) 231 with a translated reference image R 225. The input image contains many outliers, due to noisy and textureless regions in practical applications. The outlier pixels are those pixels that are inconsistent with other (inlier) pixels in the image. Therefore, a simple matching cost such as sum of squared differences (SSD) does not work well. Instead, the cost function is based on the number of inlier pixels.

First, the inlier pixels are pixels where the difference between the input specular flow vector I(u, v) and the reference specular flow vector R is less than a small threshold, e.g., 1.0. The cost function $C_2$( ) is $$C_2(I,R_{\theta,\phi,\sigma},X,Y)=-|M|, \quad (8)$$

where M is the set of inlier pixels.

Overall Procedures:

The specular flow based approach uses the same overall method as the one based on specular intensity. Reference images 225 are generated using the model 121 and the possible poses 122. An optimal translation is estimated for each reference image using the downhill simplex procedure. Here, the control parameter varies from 0 to 1. Then, all translation optimized poses are compared to determine the optimal rotation.

Fine Pose Estimation

After estimating 240 the rough pose 241, the rotational pose parameters are continuously refined 250 by minimizing a cost function 249:

$$C_F(\theta, \phi, \sigma) = \frac{1}{N_{mask}} \sum_{(u,v)} |I(u, v) - R_{\theta,\phi,\sigma,X,Y}(u, v)|^2, \quad (9)$$

where R is the reference image, with pose parameter ($\theta$, $\phi$, $\sigma$, X, Y), and $N_{mask}$ denotes the number of pixels in the stencil, which is defined as the object segmentation mask.

EFFECT OF THE INVENTION

The invention exploits specular reflection to globally estimate a 3D pose of a 3D object, using a 3D model of the object. The method can work with challenging objects, such as textureless and highly specular objects. The method uses simple matching cost functions and optimization procedures, so that the method can be implemented on a graphic processor unit (GPU) to improve performance.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

I claim:

1. A method for estimating a 3D pose of a 3D object in an environment, wherein the object has a specular surface, comprising a processor for performing steps of the method, comprising the steps of:
    generating a set of pairs of 2D reference images using a 3D model of the object, and a set of poses of the object, wherein each pair of reference images is associated with one of the poses;
    acquiring a pair of 2D input images of the object;
    estimating a rough 3D pose of the object by comparing features in the pair of 2D input images and the features in each pair of 2D reference images using a rough cost function; and
    estimating a fine 3D pose of the object using the rough 3D pose and a fine cost function, wherein the 3D pose is defined by a 3D translation vector (X, Y, Z), and 3D Euler angles ($\mu$, $\phi$, $\sigma$) for orientation.

2. The method of claim 1, wherein the Euler angles are uniformly and densely sampled for about 25,000 poses.

3. The method of claim 1, wherein the features are specular intensities.

4. The method of claim 3, wherein the reference specular intensities are generated by using a mirror bidirectional reflectance distribution function.

5. The method of claim 3, further comprising:
    arranging a mirror-like sphere in the environment without the object;
    acquiring a pair of environment images of the environment;
    constructing the environment map from the pair of environment images using a 2D plenoptic function which models illumination in the environment, and wherein the set of pairs of reference images are generated from the environment map.

6. The method of claim 3, wherein the pairs of images include a short S exposure image, and a long L exposure image, and the long exposure is about 15 times the short exposure.

7. The method of claim 6, wherein the short exposure is about 1/60 second and the long exposure is about 1/4 second.

8. The method of claim 3, wherein the rough pose is obtained by solving $$(\hat{X}, \hat{Y}, \hat{\theta}, \hat{\phi}, \hat{\sigma}) = \arg\min_{\theta,\phi,\sigma} \left( \min_{X,Y} C_R(I_L, I_S, R^L_{\theta,\phi,\sigma}, R^S_{\theta,\phi,\sigma}, X, Y) \right),$$

where ($\hat{X}$, $\hat{Y}$, $\hat{\theta}$, $\hat{\phi}$, $\hat{\sigma}$) denotes translation and Euler angles of the rough pose, and CR( ) is the a rough cost function, $I_L$ and $R_L$ are long exposure input and reference images, and $I_S$ and $R_S$ are short exposure input and reference images, and arg min is a function that returns a minimum value, and the inner minimum is determined before the outer minimum.

9. The method of claim 8, wherein the rough function $$C_R(I_L, I_S, R_{\theta,\phi,\sigma}^L, R_{\theta,\phi,\sigma}^S, X, Y) = (1-\lambda) C_1(I_S, R_{\theta,\phi,\sigma}^S, X, Y) + \lambda C_2(I_L, R_{\theta,\phi,\sigma}^L, X, Y),$$

where $\lambda$ is a control parameter, and $C_1$( ) and $C_2$( ) are cost functions for the long and short exposure images, respectively.

10. The method of claim 9, wherein highlight pixels are used for $C_1$( ) and the highlight pixels are determined by thresholding to produce a corresponding binary image, and further comprising:
    constructing corresponding reference distance image $D_R$ and input distance image $D_I$ from the binary images and a distance transform.

11. The method of claim 10, wherein the cost function $C_1$( ) is $$C_1(I_S, R_{\theta,\phi,\sigma}^S, X, Y) = \frac{1}{N_{highlight}} \sum_{(u,v)} |D_I(u, v) - D_R(u - x, v - y)|^2,$$

where (x, y) are projection points, (u, v) are pixel coordinates, $N_{highlight}$ denotes a number of pixels for the summation, and S denotes a short exposure.

12. The method of claim 9, wherein the cost function C2( ) is $$C_2(I_L, R_{\theta,\phi,\sigma}^L, X, Y) = 1 - NCC(I_L(u,v), R_{\theta,\phi,\sigma}^L(u-x, v-y)),$$

where NCC denotes normalized cross correlation, and L denotes a long exposure.

13. The method of claim 3, wherein (X, Y) denotes translation and ($\mu$, $\phi$, $\sigma$) denote Euler angles of the fine pose, and wherein the fine cost function is $$C_F(\theta, \phi, \sigma) = \frac{1}{N_{mask}} \sum_{(u,v)} |I(u, v) - R_{\theta,\phi,\sigma,X,Y}(u, v)|^2, \,$$

where (u, v) are pixel coordinates of the input image I and the reference images R, NCC denotes normalized cross correlation, and L denotes a long exposure.

14. The method of claim 1, wherein the features are specular flows.

15. The method of claim 14, wherein the specular flow is due to a rotation of the environment around a predetermined viewing direction of a camera acquiring the 2D images.

16. The method of claim 15, wherein the rotation is about 5±degrees.

17. The method of claim 14, wherein the specular flows are determined using block matching and a color coded environment map.

18. The method of claim 14, wherein (X, Y) denotes translation and ($\mu$, $\phi$, $\sigma$) denote Euler angles of the pose, and the rough cost function is $$C_R(I, R_{\theta,\phi,\sigma}, X, Y) = (1-\lambda)C_1(I, R_{\theta,\phi,\sigma}, X, Y) + \lambda C_2(I, R_{\theta,\phi,\sigma}, X, Y),$$

where $\lambda$ is a control parameter, and C1( ) and C2( ) are cost functions based on motion segmentation and the specular flows, respectively, and R and I represent the reference images and the input images, respectively.

19. The method of claim 18, further comprising:
constructing corresponding reference distance image $D_R$ and input distance image $D_I$ from the binary images and a distance transform, and wherein the cost function C1( ) is $$C_1(I, R_{\theta,\phi,\sigma}, X, Y) = \frac{1}{N_{motion}} \sum_{(u,v)} |D_I(u, v) - D_R(u-x, v-y)|^2,$$

where (x, y) are projection points, (u, v) are pixel coordinates, the summation is carried out for motion segmentation pixels of the reference image R, and $N_{motion}$ denotes a number of such pixels.

20. The method of claim 18, further comprising:
comparing the reference specular flow image R and input specular flow image I, finding the inlier pixels where the difference between the input specular flow vector and the reference specular flow vector is less than a small threshold, and wherein the cost function C2( ) is $$C_2(I, R_{\theta,\phi,\sigma}, X, Y) = -|M|,$$

where M is the set of inlier pixels.

21. The method of claim 14, where (X, Y) represents translation and ($\mu$, $\phi$, $\sigma$) represent Euler angles of the 3D pose and the fine cost function is $$C_F(\theta, \phi, \sigma) = \frac{1}{N_{mask}} \sum_{(u,v)} |I(u, v) - R_{\theta,\phi,\sigma,X,Y}(u, v)|^2,$$

where (u, v) are pixel coordinates, R is the reference image, with the pose parameter ($\theta$, $\phi$, $\sigma$, X, Y), and $N_{mask}$ denotes a number of a stencil, which is defined as an object segmentation mask.

* * * * *